Feb. 20, 1934.   B. HIRSCHHORN   1,947,523
BAG FOR COFFEE PERCOLATORS
Filed April 30, 1932
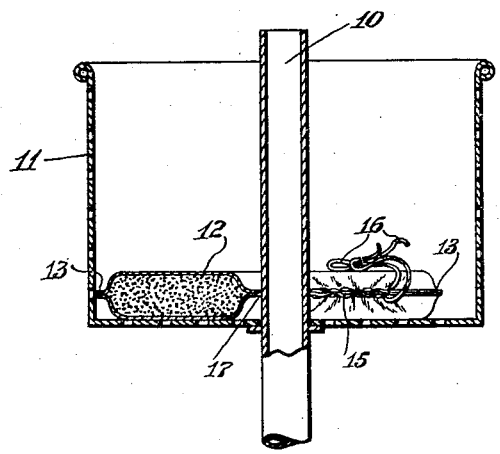
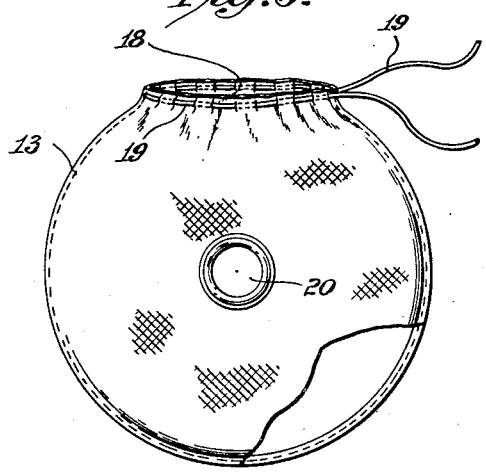
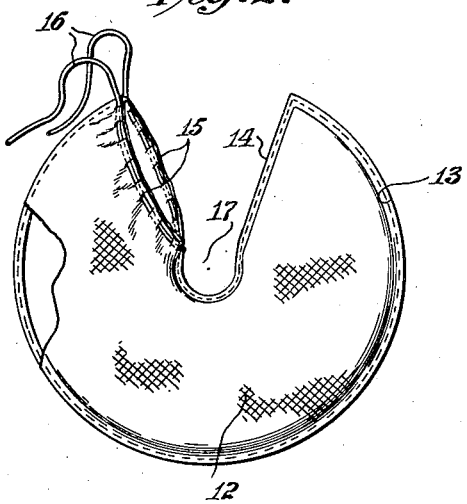
INVENTOR
Benjamin Hirschhorn
BY
ATTORNEYS Patented Feb. 20, 1934

1,947,523

UNITED STATES PATENT OFFICE 1,947,523

BAG FOR COFFEE PERCOLATORS

Benjamin Hirschhorn, New York, N. Y., assignor to Millie Patent Holding Co. Inc., New York, N. Y., a corporation of New York Application April 30, 1932. Serial No. 608,444

6 Claims. (Cl. 53—3)

The present invention relates to receptacles for receiving substances from which the essence is to be extracted and embodies, more specifically, an improved receptacle having an opening which enables a desired amount of substance to be inserted into the receptacle, a suitable closure being provided to facilitate the opening and closing of the receptacle.

More particularly, the invention embodies an improved receptacle adapted to be used in a percolator and being of such construction that a desired amount of substance may be inserted into the receptacle and confined therein during the process of extracting essence therefrom. In this connection, receptacles have been designed heretofore of annular form, whereby the receptacle may be placed within the perforated cup of the percolator and about the water pipe in order that water may percolate through the receptacle and substance carried thereby. In using these existing forms of receptacles, considerable difficulty has been experienced in removing the receptacle from the percolator cup after the coffee or other substance has been brewed. The annular formation of the receptacle causes binding of the central recess thereof about the water pipe of the percolator unless the receptacle is lifted simultaneously from opposite sides.

A further disadvantage of existing receptacles is that they offer but a limited range of choice in flavor and strength in brewing the liquid. Inasmuch as each receptacle contains a definite amount of coffee or other substance, the range of choice in strength and quantity brewed is limited by the number of receptacles used. Should a quantity be desired other than that provided by a given multiple of receptacles of the existing forms, no accurate means would exist for determining the correct strength and flavor thereof.

An object of the invention, accordingly, is to provide an improved receptacle for substances, such as coffee and the like, the receptacle being particularly well suited for use in percolators and being formed in such fashion as to be readily removed therefrom by a force applied to the receptacle at a single point.

A further object of the invention is to provide a receptacle for coffee and the like, adapted for use in percolators and being provided with an opening having a closure to enable a desired quantity of substance to be inserted into the receptacle.

A further object of the invention is to provide a receptacle for coffee and the like adapted to be used in percolators, being provided with a closure which is adapted to facilitate the removal of the receptacle from a percolator.

Further objects, not specifically enumerated above, will be apparent as the invention is described in greater detail in connection with the accompanying drawing, wherein:

Figure 1 is a view in section, taken through the water pipe and cup of a percolator and showing a receptacle therein constructed in accordance with the present invention.

Figure 2 is a plan view, partly broken away, showing a receptacle constructed in accordance with the present invention.

Figure 3 is a view similar to Figure 2, showing a modified form of the invention.

With reference to the above drawing, the parts of a percolator adapted to receive receptacles of the form described herein are shown in Figure 1, and comprise a water pipe 10 and a cup 11 which is formed with a plurality of apertures in order that liquid may percolate therethrough. Within the cup 11 and about the water pipe 10, a bag-like receptacle 12 is inserted, the receptacle being in circular form and sewed at 13 about its periphery. The receptacle may be formed of any porous fabric, such as gauze, perforated cellophane, etc. The periphery of the receptacle is interrupted by a notch 17 which is formed by a seam 14 and edges 15. This notch forms a central opening which extends out to the periphery of the receptacle. The seam and edges preferably extend in substantially radial directions and thus form a notch which is adapted to receive a water pipe 10 of the percolator.

The edges 15 of the top and bottom layers which are united by the seams 13 and 14 are provided with a draw string or other closure 16 in order that a desired amount of substance may be introduced and confined in the receptacle. After the substance has been introduced into the receptacle the draw string 16 is closed and the receptacle placed in the percolator cup as shown in Figure 1.

When the receptacle is to be removed, the removal is accomplished by lifting upon the draw string 16. Inasmuch as the water pipe 10 is received within the notch 17, no binding will occur and the receptacle may be readily removed from the percolator cup.

In the form of receptacle shown in Figure 3, the seam 13 instead of being interrupted by a notch, is interrupted by an opening 18 about which a draw string or other suitable closure 19 is secured in order that the receptacle may be filled with a desired quantity of substance and effectively closed. A central aperture 20 is formed in the receptacle through the sides thereof and is adapted to receive the water spout 10 of the percolator.

The manner in which the receptacles described herein are used will be readily apparent and it will be seen that the draw strings thereof not only enable a desired quantity of substance to be confined within the receptacles but also afford a convenient means for removing the receptacles from percolator cups.

While the invention has been described with specific reference to the accompanying drawing, it is not to be limited, save as defined in the appended claims.

I claim as my invention:

1. A receptacle adapted to receive a substance from which the essence is to be extracted and used in a percolator having a water pipe, said receptacle being formed with an opening in the periphery thereof, a portion adapted to receive a percolator water pipe, and a manually operable closure for the opening, whereby the receptacle may be opened and closed at will.

2. A receptacle adapted to receive a substance from which the essence is to be extracted and used in a percolator having a water pipe, said receptacle being formed with an opening whereby the same may be charged with a suitable substance, a portion adapted to receive a percolator water pipe, and a combined closure and handle for the opening.

3. A receptacle adapted to receive a substance from which the essence is to be extracted and used in a percolator having a water pipe, said receptacle being formed with an opening, a portion adapted to receive a percolator water pipe, and a draw string secured to the receptacle adjacent the opening to close the same and serve as a handle for the receptacle.

4. A porous receptacle adapted to receive a substance from which the essence is to be extracted and used in a percolator having a central water pipe, said receptacle being formed with a substantially curved outer edge and a notch formed therein extending adjacent the central portion thereof.

5. A porous receptacle adapted to receive a substance from which the essence is to be extracted and used in a percolator having a central water pipe, said receptacle being formed with a substantially curved outer edge, a notch formed in the receptacle extending adjacent the central portion thereof, an opening formed in the receptacle, and a closure for the opening.

6. A porous receptacle adapted to receive a substance from which the essence is to be extracted and used in a percolator having a central water pipe, said receptacle being formed with a substantially curved outer edge, a notch formed in the receptacle extending adjacent the central portion thereof, an opening formed in the receptacle, and a combined handle for the receptacle and closure for the opening.

BENJAMIN HIRSCHHORN.